Dec. 16, 1958   J. E. A. DOYEN   2,864,881
TRIGGERABLE ELECTRO-CHEMICAL GENERATORS
Filed April 8, 1955   2 Sheets-Sheet 1
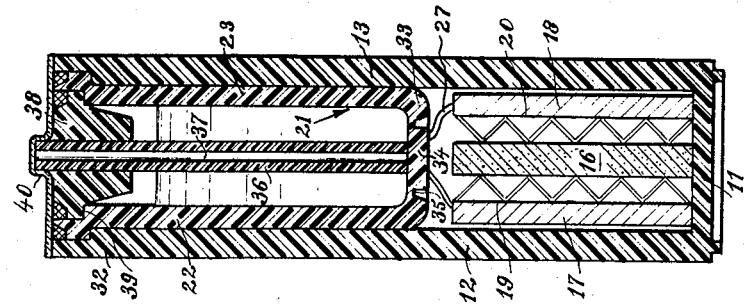
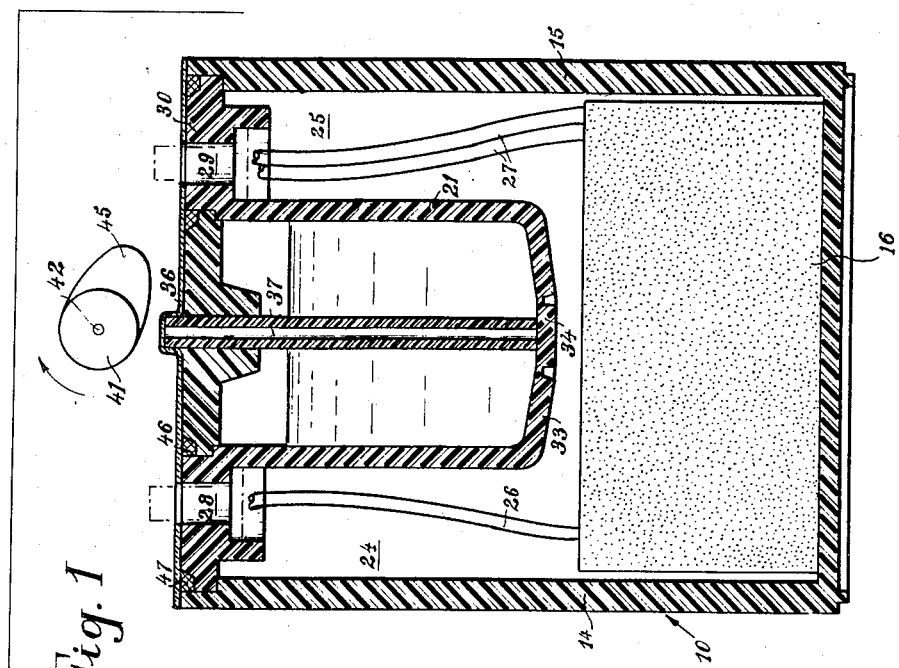
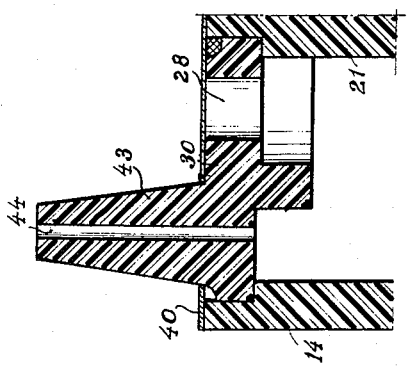
J.E.A. DOYEN
INVENTOR.
BY *Karl F. Ross*
AGENT

United States Patent Office 2,864,881
Patented Dec. 16, 1958

2,864,881

TRIGGERABLE ELECTRO-CHEMICAL GENERATORS

Jean Eugène Alphonse Doyen, Paris, France, assignor to Yardney International Corporation, New York, N. Y., a corporation of New York Application April 8, 1955, Serial No. 500,244

Claims priority, application France April 9, 1954

3 Claims. (Cl. 136—113)

My invention relates to a triggerable electro-chemical generator of energy, also known as a deferred-action battery.

It is an object of the invention to provide a generator of the type wherein the delivery of an electrical output is caused by the entrance of electrolyte into a container containing the electrodes, which generator is compact, lightweight, and capable of being stored for practically unlimited periods of time in inoperative condition wherein substantially none of its potential energy is lost. A more specific object is to provide such a generator which is particularly desirable for use in cases where the electro-chemically active substances comprise silver and zinc.

An exemplary construction of a silver-zinc generator of the type specified will now be described in detail with reference to the accompanying drawing wherein:

Fig. 1 is a vertical section;

Fig. 2 is a vertical section on a plane normal to that of Fig. 1;

Fig. 3 is a sectional view of a detail; and

Figure 4:
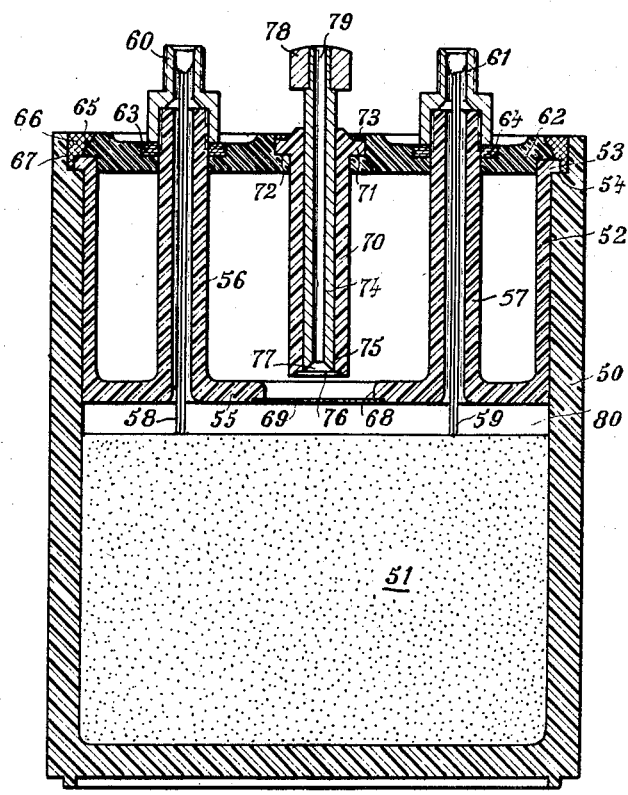
Fig. 4 is similar to Fig. 1, but illustrates a variation.

Referring to Figs. 1 to 3, the electro-chemical generator comprises a box-shaped casing 10 having a bottom wall 11 in the form of an elongated rectangle, large sides 12 and 13 and small sides 14 and 15. Arranged in the bottom of the casing and extending over approximately one-half the vertical extent thereof are the electrodes, consisting of cases of active material of alternating polarity.

In the embodiment here described, a silver electrode 16 is sandwiched between two zinc electrodes 17 and 18. Actually the electrodes are in the charged condition, that is to say, they are in the same condition as they would assume if they were part of an accumulator after the latter has been charged, so that the electrode 16 consists of silver peroxide and the electrodes 17 and 18 consist of zinc. The electrode material is advantageously in finely divided form. Preferably the electrodes are free of any wrapping or packing means. Interposed between each adjacent two electrodes are suitable separators, there being a separator 19 between the electrodes 17 and 16 and a separator 20 between electrodes 16 and 18. The separators may be made of any of the usual materials employed for the purpose.

Preferably however, in cases where the generator is intended to provide only a single useful discharge, the separators are not made from a semi-permeable material, such as regenerated cellulose or "cellophane," but rather a permeable material is used. The permeable material used may be rigid, such as an expanded body of the plastic known by the trade name "Lucoflex" or a grating of polystyrene; or it may be flexible, such as glass wool or so-called "Joseph" paper.

Arranged in the casing 10 above the electrodes is a container 21 holding a supply of liquid electrolyte, herein an aqueous solution of potassium hydroxide, though the solution may contain other substances instead of or in addition thereto. The container is generally box-shaped having its large sides 22 and 23 closely adjacent the large sides 12 and 13 of the casing 10. The container is shorter in length than the casing, so as to provide intervals 24 and 25 at both ends for the passing of conductors 26 and 27 connecting the electrodes with terminals adapted to be inserted in the apertures 28 and 29. The apertures are formed in an annular rim or flange 30 of the container 21 resting upon a shoulder 32 formed near the top of the sides of the casing 10. The base 33 of the container 21 includes a central area 34 defined by grooves 35 such that the area 34 can be broken away with moderate ease. Resting upon the center of area 34 is the lower end of a tubular rod or plunger 36 having an axial duct 37 and extending through the cover 38 of the container 21, this cover resting on a shoulder 39 provided near the top of the container walls. The upper end of rod 36 projects above the cover 38. Overlying the top of the whole assembly including the top of rod 36 is a cover sheet 40. Above the assembly and in a position to cooperate with the top of rod 36 is a cam 41 mounted for rotation on a shaft 42.

Desirably the rim 30 may have a frustoconical boss 43 upstanding from its upper surface as shown in Fig. 3 and formed with a duct 44 through it this duct, opening into the interior of casing 10 outside the walls of container 21.

In operation, a vacuum may be created within the casing 10 by connecting the duct 44 with a vacuum pump. The duct is thereafter sealed tightly by any suitable means, as by fusing. Similarly the respective joints between the cover elements and the walls of the casing and the container, such as those indicated at 46 and 47, are tightly sealed by fusion, so that the vacuum will be retained within the casing 10.

To use the generator described, the cam 41 may be rotated for example as indicated by arrow $f$. It will be understood however that any other suitable impact means may be used instead of the cam. The projecting part 45 of the cam exerts a downward force upon the rod 36 sufficient to break away the central area 34, at the same time stripping the protective covering 40 from the top of plunger 36. The electrolyte present in the container 21 thus rushes into the lower part of the casing 10 containing the electrodes, this inrush of electrolyte being particularly forceful owing to the vacuum prevailing in the lower compartment of the tank whereas the electrolyte in the container is under atmospheric pressure due to the vent or duct 37. As a result of the flow of electrolyte upon the unprotected electrodes a high current is immediately available with a maximum utilization of the electro-chemically active substances comprising the electrodes.

Reference is now made to Fig. 4. A main casing 50 contains within a lower compartment thereof a set of electrodes 51, comprising electro-chemically active substances of different polarities adapted, on being contacted or impregnated with electrolyte, to generate the desired electrical energy. In an upper compartment of the casing 50 there is located a container 52 holding a supply of electrolyte, the container having an outer flange 53 at its top by which the container is supported on a shoulder 54 formed adjacent the top of casing 50. The container 52 is so formed in horizontal section as to have an outer periphery substantially corresponding with the inner periphery of the casing 50, the outer wall surfaces of container 52 engaging the inner wall faces of the casing 50.

Upstanding from the bottom 55 of container 52 are vertical conduits 56 and 57 serving to carry out the conductors 58 and 59 respectively connected with electrodes 51 of each polarity and soldered at their upper ends to respective terminals 60 and 61 secured to the tops of conduits 56 and 57 for connection with a load circuit. The conduits 56 and 57 extend through a cover plate 62 sealing the top of container 52, gaskets 63 and 64 being provided for sealing the conduits to the cover plate. The terminals 60 and 61 are screwed over threaded portions on the tops of conduits 56 and 57. The periphery of cover plate 62 is formed with a bevel portion 65 and a strip of adhesive material 66 is inserted between the bevel surface, the reduced section 67 providing the upper edge of casing 50 and flange 53.

The bottom 55 of container 52 is formed with a wide aperture 68 centrally therein, normally sealed by a strip 69 of suitable material such as polystyrene. Overlying this strip is the lower end of a guide sleeve 70 depending from the top cover plate and supported therefrom by a flange 71 of the sleeve engagig an annular seat or shoulder 72 formed in the cover plate 62 with the sleeve 70 extending through the cover plate. A strip of adhesive 73 is provided for bonding the sleeve 70 with the cover 62. Received within the sleeve 70 for smooth frictional sliding displacement therein is a tubular plunger or triggering member 74 having a sharp cutting edge 75 at its lower end. This cutter edge in the inoperative condition of the trigger member, as illustrated, engages a strip 76, made of a suitable material such as polystyrene, secured to the lower end of the sleeve 70 so as to seal the duct 77 therein. The tubular trigger member 74 has secured to its upper end a head or knob 78 e. g. screwed on the member 74.

The device described operates in a manner similar to that disclosed hereabove. In the condition illustrated, the electrodes are dry and no output current is supplied to the load circuit connected across terminals 60 and 61. In this condition the space 80 in which the electrodes are located is perfectly sealed from the interior of container 52 and also from the surrounding atmosphere by means of the gaskets, adhesive and strips 76 and 69 as described. The generator therefore retains its charge over practically unlimited periods of time.

When it is desired that the generator deliver output energy, the trigger member 74 is pushed in by acting on the head 78, e. g. by punching it with one's fist or by cam action. In the resulting downward movement of member 74 the cutter edge 75 first breaks through the strip 76, thereby placing the interior of container 52, previously sealed from atmosphere, in communication with the outer atmosphere through the duct 79 extending within tubular member 74. The cutter edge 75 then cuts through the strip 69 and the electrolyte in the container 52 is discharged into the compartment 80 containing the electrodes. Preferably a vacuum is created within the compartment 80 during manufacture of the device in order to ensure a more rapid and positive irruption of electrolyte into this compartment on operation of the device.

What I claim is:

1. An electrochemical deferred-action battery comprising a casing, an electrode assembly in said casing, a sealed container in said casing above said electrode assembly, said container having a cover, a tubular guide depending from said cover and a tubular plunger displaceably mounted in and closely surrounded by said guide for movement toward the bottom of said container, said bottom having a frangible portion in line with said plunger, said portion having a predefined area substantially exceeding the cross-sectional area of said plunger, and rupturable seal means closing an end of said guide, said seal means being adapted to be broken upon a descent of said plunger to fracture said frangible portion.

2. A batery according to claim 1, wherein said guide extends below the lower end of said plunger and terminates a substantial distance above said frangible portion, said seal means spanning the lower end of said guide.

3. A battery according to claim 1, wherein a part of said casing containing said electrode assembly is evacuated.

References Cited in the file of this patent

UNITED STATES PATENTS

| | | |
|---|---|---|
| 781,817 | Foster | Feb. 7, 1905 |
| 1,218,847 | Firey | Mar. 13, 1917 |
| 2,452,049 | Hauck | Oct. 26, 1948 |
| 2,502,723 | Harriss | Apr. 4, 1950 |
| 2,529,511 | Murphy | Nov. 14, 1950 |
| 2,594,709 | Andre | Apr. 29, 1952 |
| 2,624,767 | Moulton | Jan. 6, 1953 |
| 2,763,706 | Barrett | Sept. 18, 1956 |